United States Patent [19]

Flachbarth

[11] 4,295,575

[45] Oct. 20, 1981

[54] SURFACE RACEWAY BOX

[75] Inventor: Charles T. Flachbarth, Parkersburg, W. Va.

[73] Assignee: Butler Manufacturing Co., Kansas City, Mo.

[21] Appl. No.: 841,945

[22] Filed: Oct. 13, 1977

Related U.S. Application Data

[63] Continuation of Ser. No. 718,590, Aug. 30, 1976, abandoned.

[51] Int. Cl.³ .............................................. H02G 3/12
[52] U.S. Cl. ................................... 220/3.92; 220/3.8; 220/3.94
[58] Field of Search .................. 220/3.92, 3.3, 3.9, 220/3.94, 327, 241, 242, 3.8

[56] References Cited

U.S. PATENT DOCUMENTS

| | | | |
|---|---|---|---|
| 1,201,003 | 10/1916 | Van Duzer | 220/3.92 X |
| 1,769,379 | 7/1930 | Madden | 220/3.9 X |
| 2,622,756 | 12/1952 | Appleton | 220/3.94 |
| 2,832,495 | 4/1958 | Batts | 220/3.94 X |
| 2,936,092 | 5/1960 | Johnson | 220/3.8 X |
| 2,968,689 | 1/1961 | Johnson | 220/3.8 X |

Primary Examiner—Steven M. Pollard
Attorney, Agent, or Firm—Frederick J. Olsson

[57] ABSTRACT

The box has a base for mounting on a surface and a cover secured to the base by screws. A pair of tabs are disposed close to the base end of the cover and each tab captivates a screw. Assembly of cover to base is simplified because the cover can be held in one hand while a screw driver in the other hand turns the screws. Inventory is reduced because a single length of screw is employed irrespective of box depth.

1 Claim, 5 Drawing Figures

SURFACE RACEWAY BOX

This application is a continuation of my pending application Ser. No. 718,590 filed Aug. 30, 1976, now abandoned and entitled Surface Raceway Box.

This invention relates to surface raceway systems and in particular relates to a device for use as a receptacle, switch, distribution or utility box for such systems.

Surface raceway boxes normally comprise a flat base and a hollow cover. The base is mounted on a wall or other like surface with the cover being secured to the base by screws. The cover mounts a switch, a receptacle or the like or is arranged to perform some other function.

Boxes of the kind in question have heretofore been secured to the base by long screws extending from the top of box down into threaded holes in the base. It has always been difficult and, therefore, time wasting for electricians to put the screws into position for threading. Moreover, such boxes must be available in a wide variety of depths, thus a special screw is needed for each box.

The present invention provides a box structure which eliminates the assembly problem and permits a single length screw to serve for all boxes.

A pair of tabs inside the cover are disposed closely adjacent the open end. Each tab captivates a screw which, when the box is positioned on the cover, is automatically aligned with the threaded holes in the base. A screw driver is extended through the open top and through the box to engage and turn the screws.

Assembly becomes a very simple operation. The cover is held in one hand and positioned over the base and held steady while the other hand manipulates a screw driver. As will be more apparent later, the length of each screw is independent of the box depth so a single length screw suffices for any depth of box.

The details of the invention will be apparent from the following description taken in conjunction with the drawings wherein.

Figure 1:
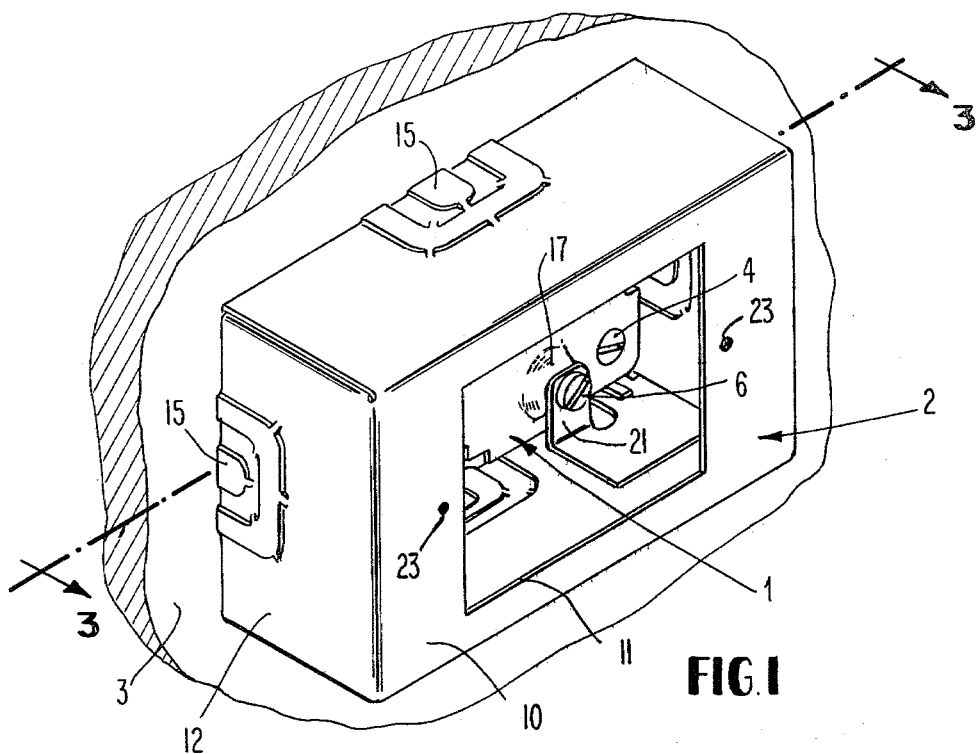
FIG. 1 is a perspective view of a box of the invention as mounted on a wall.
Figure 2:
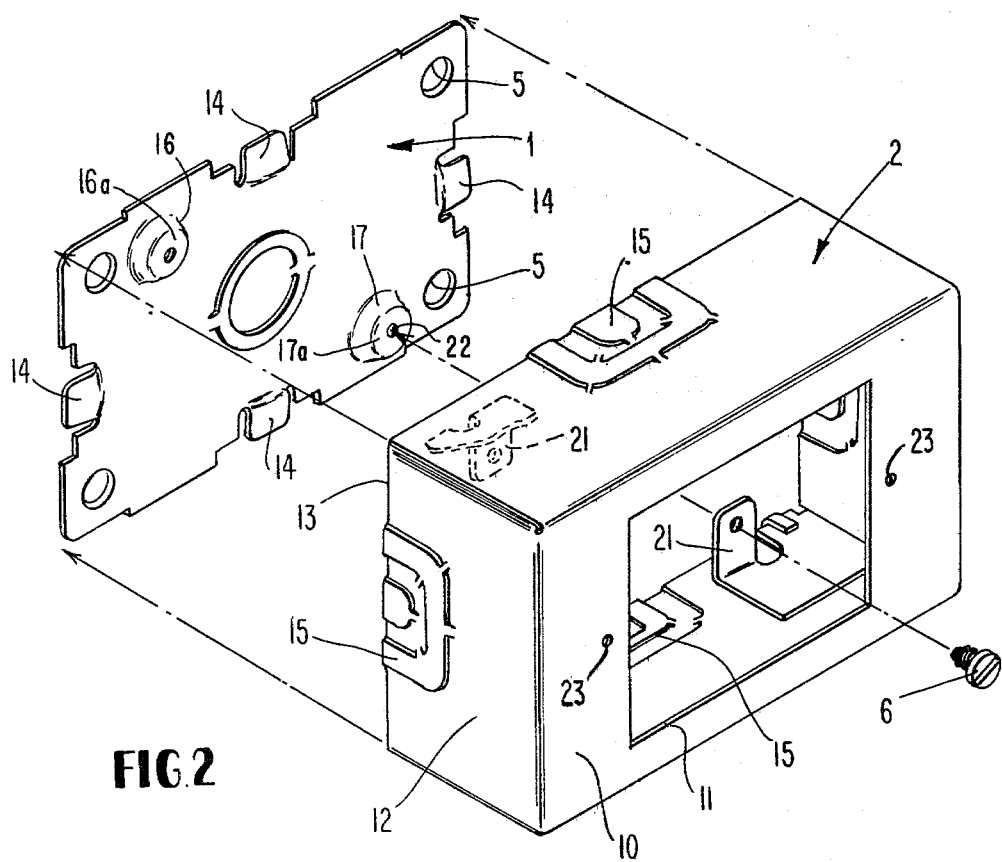
FIG. 2 is exploded view of the box in FIG. 1.

In FIGS. 1 and 2 the base is indicated at 1 and the cover at 2. The base is secured to the wall 3 as by the screws 4 extending through holes 5. The cover 2 is secured to the base 1 as by the screws 6.

The top 10 of the cover is provided with opening 11 and has a continuous wall 12 extending away from the top. The edge 13 of the wall 12 forms the open end of the box. As noted, the top 10 and the wall 12 form a hollow structure.

Figure 3:
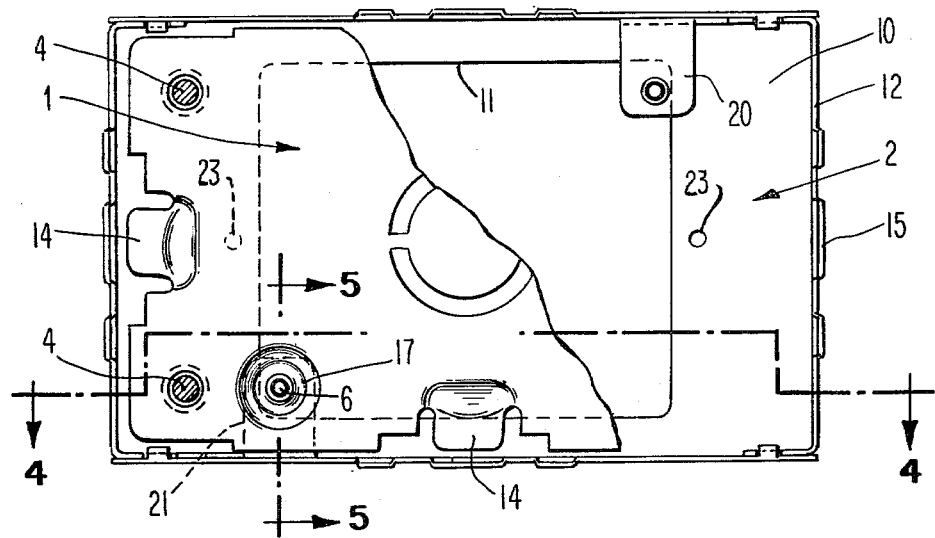
FIG. 3 is a view looking at the bottom of the base of the box with the base being partially broken away.

The rectangular shape of the wall 12 corresponds to the rectangular shape of the base. With reference to FIG. 3 it will be seen that the outside dimensions of the base are smaller than the inside dimensions of the wall so that the cover fits over the base and conceals the same when it is secured in position as in FIG. 1. However, the base and cover may be dimensioned so that the outer edge 13 of the wall fits directly on the peripheral edge of the cover.

The improved means of the invention for securing the cover to the base will next be explained.

The base 1 is generally flat and has lip sections 14 for engaging the bases of raceways which may be connected to the box. Correspondingly, the cover has knock-out sections 15 for engaging the connected covers of the raceways.

The base 1 has a pair of bosses 16 and 17 which extend upwardly from the base. When the cover is assembled to the base as noted in FIGS. 1 and 4, the bosses extend inside of the cover. The bosses have tops or raised sections 16a and 17a respectively including threaded holes 18 and 19.

The cover has a pair of tabs 20 and 21 which are secured to the wall 12. Tabs are spaced away from the top 10 and are disposed closely adjacent the outer edge 13 or the open end of the cover.

The tabs rotatably mount the screws 6. The tabs and bosses are located so that when the cover is set-up over the base in assembly position, the screws 6 are aligned with the threaded holes in the bosses. See dotted lines 6 and 21 in FIG. 5.

The opening 11 in the top provides access for a screw driver to extend through the box to engage and turn screws 6.

It will be apparent that with the screws mounted in the tabs and aligned with the threaded holes in the bosses, the assembly of the cover to the base becomes a relatively simple matter.

Figure 5:
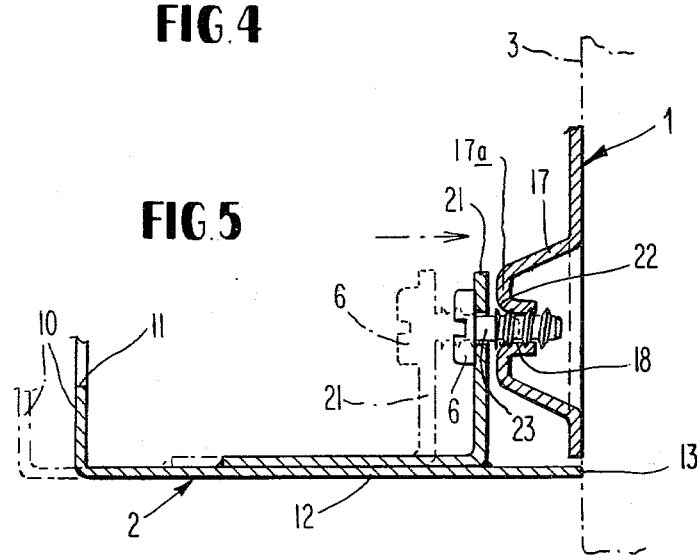
FIG. 5 is a fragmentary elevational view taken along the lines 5—5 of FIG. 3.

It is preferred that the top or raised section of each boss be somewhat indented as indicated at 22 in FIG. 5. This provides a pilot means for the tip of the screw.

As particularly noted in FIG. 5, the interior of the boss 17 positions the screw 6 so that the end of the screw is spaced away from the wall 3. This avoids the tip of the screw engaging the wall and tending to pull the base away from the wall as the screw is turned home.

Preferably in the assembled position the tab is spaced about 1/32" from the top of the boss. Thus, if the screw is excessively turned the tab will slightly bend and engage the top of the boss. This avoids pulling the base way from the wall.

Figure 4:
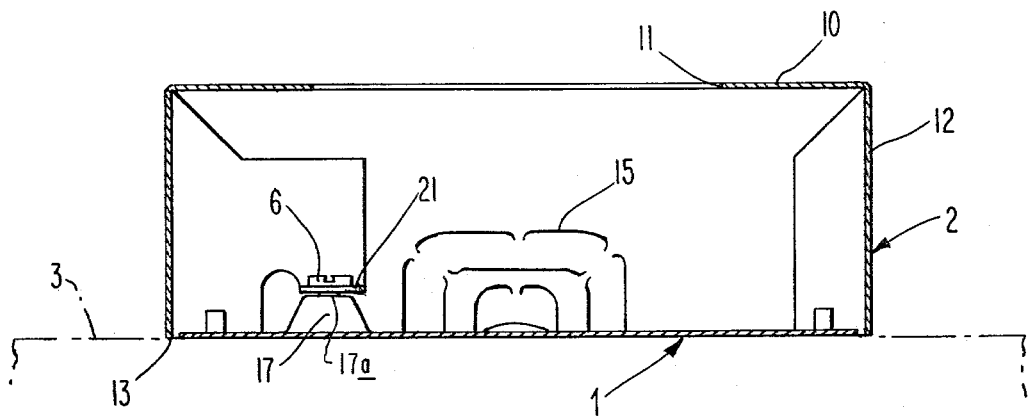
FIG. 4 is an elevational view taken along the lines 4—4 of FIG. 3.

Note also, with reference to FIGS. 4 and 5 that the raised section 17a of boss 17 is positioned close to the outer edge 13 and substantially spaced from the underside of the top 10 when the cover is secured to the base. The same condition pertains for the raised section 16a.

With reference to FIG. 5, it will be evident that the arrangement provides that single length screw can be used for securing the cover to the base irrespective of the distance between the top 10 and the open end 13 or the depth of the box.

Preferably the screws 6 are captured on the tabs. This may be as shown in FIG. 5 by making an undercut 23 or a fiber washer may be threaded over the threads of the screw until it engages the underside of the tab.

As noted heretofore, the box can be employed for a receptacle, a switch, etc. Thus, the holes 23 in the top of the cover are used to secure a receptacle, a switch or a close-off plate in position on the cover 2.

I claim:

1. In a surface raceway box of the known type having a flat base and a hollow, open-ended cover to be secured to the base, the base being for use in mounting the box on a building wall or a like surface and the cover having a top and a continuous wall extending away from the top with the outer edge of the wall forming said open-end and the top also having access opening means providing access to the cover interior, the improvement for securing the cover to the base which comprises:
  a pair of spaced bosses on said base, each boss having a raised section including a hole for receiving the threads of a screw, the bosses being dimentioned so that each raised section is spaced away from the base so as to be located inside said cover when the cover is secured to the base in a position close to said outer edge and substantially spaced away from the underside of said top;
  a pair of tabs respectively secured to the inside of said cover wall, each tab being located closely adjacent said outer edge and substantially spaced away from the underside of said top and each tab having a screw captured and rotatably mounted thereon, the tabs being located so that when the cover is positioned over the base to be secured thereto the tabs are respectively positioned over and closely adjacent said raised section whereby the screws are respectively aligned with said holes in condition to be turned into threaded engagement for holding the cover secure to the base;
  said top access opening means and said captured screws being aligned with said holes in condition to be turned into threaded engagement providing for easy assembly of the cover to the base by that a screw driver can extend through said top access opening means and through the cover interior to contact and turn said screws into said threaded engagement;
  the length of each said screw being made so that when the screw is turned into said threaded engagement the screw extends into the boss less than the full depth of the boss; and
  said disposition of said tabs closely adjacent said outer edge providing for single length screws to be employed irrespective of the length of said wall taken between said top and said outer edge.

* * * * *